United States Patent [19]

Nelson et al.

[11] Patent Number: 4,659,637
[45] Date of Patent: Apr. 21, 1987

[54] ELECTROCHEMICAL CELL WITH HIGH CONDUCTIVITY GLASS ELECTROLYTE

[75] Inventors: Paul A. Nelson, Wheaton; Ira D. Bloom, Lisle; Michael F. Roche, Glen Ellyn, all of Ill.

[73] Assignee: The United States of America as represented by the United States Department of Energy, Washington, D.C.

[21] Appl. No.: 853,104

[22] Filed: Apr. 17, 1986

[51] Int. Cl.$^4$ ............................................. H01M 6/18
[52] U.S. Cl. .................................... 429/104; 429/193; 429/31
[58] Field of Search .................... 429/104, 30, 31, 191, 429/193, 185

[56] References Cited

U.S. PATENT DOCUMENTS

| | | | |
|---|---|---|---|
| 3,413,150 | 11/1968 | Kummer et al. | 429/104 X |
| 3,811,943 | 5/1974 | Minck et al. | 429/104 |
| 3,982,959 | 9/1976 | Austin et al. | 429/31 X |
| 4,055,710 | 10/1977 | May et al. | 429/104 |
| 4,173,686 | 11/1979 | Brennan | 429/104 |
| 4,219,613 | 8/1980 | Anand et al. | 429/104 |
| 4,310,607 | 1/1982 | Shay | 429/104 |
| 4,357,398 | 11/1982 | Nelson et al. | 429/94 |
| 4,460,662 | 7/1984 | Damrow et al. | 429/104 |
| 4,544,614 | 10/1985 | Kucera et al. | 429/193 |
| 4,590,136 | 5/1986 | Buehler et al. | 429/104 |

Primary Examiner—Anthony Skapars
Attorney, Agent, or Firm—Hugh W. Glenn; Robert J. Fisher; Judson R. Hightower

[57] ABSTRACT

A secondary electrochemical cell with sodium-sulfur or other molten reactants is provided with a ionically conductive glass electrolyte. The cell is contained within an electrically conductive housing with a first portion at negative potential and a second portion insulated therefrom at positive electrode potential. The glass electrolyte is formed into a plurality of elongated tubes and placed lengthwise within the housing. The positive electrode material, for instance sulfur, is sealed into the glass electrolyte tubes and is provided with an elongated axial current collector. The glass electrolyte tubes are protected by shield tubes or sheets that also define narrow annuli for wicking of the molten negative electrode material.

17 Claims, 6 Drawing Figures

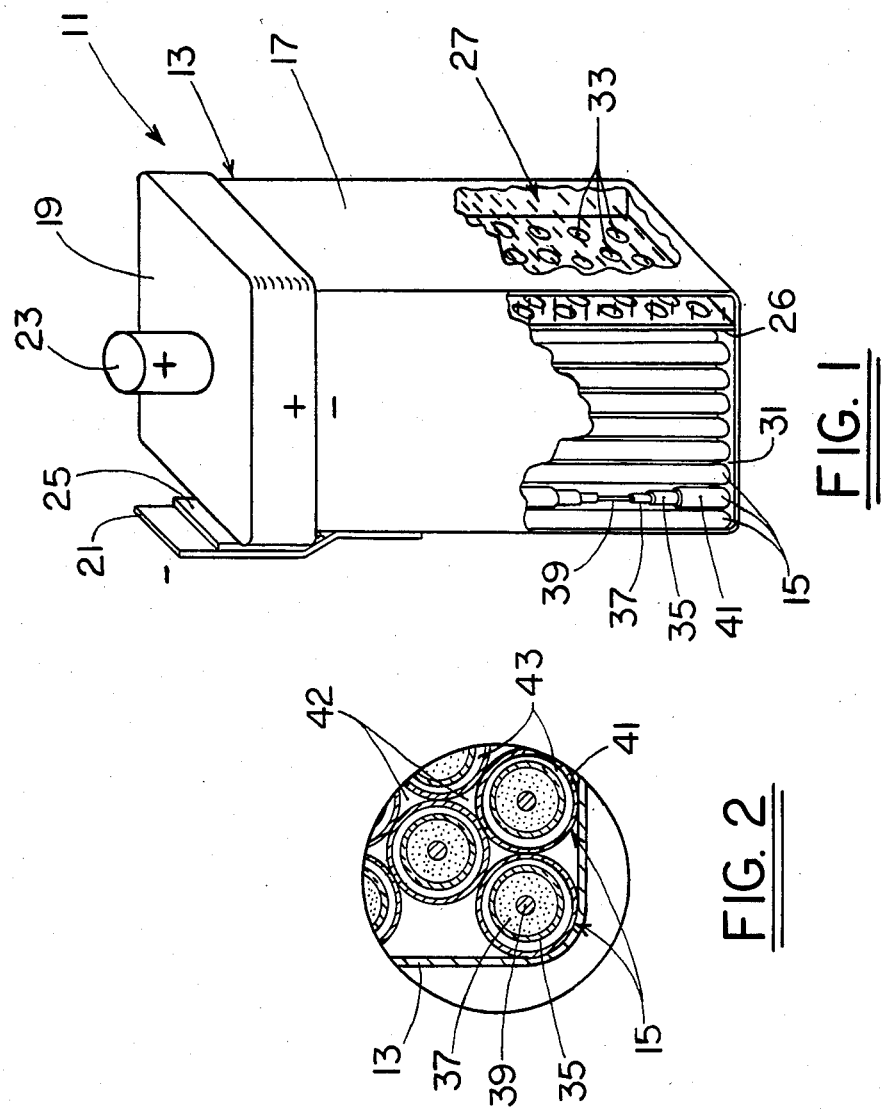

ELECTROCHEMICAL CELL WITH HIGH CONDUCTIVITY GLASS ELECTROLYTE

CONTRACTUAL ORIGIN OF THE INVENTION

The United States Government has rights in this invention pursuant to Contract No. W-31-109-ENG-38 between the U.S. Department of Energy and the University of Chicago, the operator of Argonne National Laboratory.

BACKGROUND OF THE INVENTION

This invention relates to high temperature electrochemical cells that use molten alkali metals as negative electrode material and molten chalcogens as positive electrode materials. An ionically conductive glass electrolyte composition separates the electrodes and permits the electrochemical reaction to occur. In particular, this invention relates to the use of sodium-sulfur electrochemical cells with glass electrolytes of soda, zirconia, alumina and silica.

Sodium-sulfur electrochemical cells are most often provided with an electrolyte of crystalline beta alumina which is characterized by high ionic conductivity. However, this material is frangible and requires difficult and expensive fabrication techniques. Furthermore, it has not endured well particularly at grain boundaries on long exposure to molten sulfur, sodium and polysulfides at high temperature conditions.

Amorphous glass electrolytes have good fabrication properties but exhibit low ionic conductivities and often are unstable in sodium-sulfur cell environments. In one program sponsored by U.S. Department of Energy under Contract No. DE-AC02-76ET25103, a hollow glass fiber was developed as electrolyte for a sodium-sulfur secondary electrochemical cell. However, due to its very low ionic cnductivity, e.g. at 300° C., $4-5\times10^{-5}$ (ohm-cm)$^{-1}$, very small diameter, elongated fibers were required to provide a large electrolyte surface area and a short ion migration path.

In a recent effort by Kucera et al., U.S. Pat. No. 4,544,614, Oct. 1, 1985, an ionically conductive glass with conductivies of more that $2\times10^{-3}$ ohm-cm$^{-1}$ at 300° C. were prepared. Though the use of a glass with this greatly improved ionic conductivity, the inventors have discovered substantial improvements that can be incorporated into an electrochemical cell design.

SUMMARY OF THE INVENTION

Therefore, it is an object of the present invention to provide an electrochemical cell design that incorporates glass electrolyte of high ionic conductivity.

It is a further object to provide such a design with substantially larger glass electrolyte elements than previously were feasible.

It is also an object to provide a sodium-sulfur electrochemical cell design with improved heat transfer characteristics.

It is yet another object to provide a sodium-sulfur electrochemical cell design containing a plurality of electrode elements with good heat transfer from the inner elements to outside heat transfer surfaces.

In accordance with the present invention, a secondary electrochemical cell is presented with chalcogen-containing positive electrode material and alkali metal-containing negative electrode material. The electrochemical cell includes an electrically conductive housing with a first portion of negative electrode potential and second portion of positive electrode potential. An electrically insulated seal is disposed between the first and second portions. A plurality of elongated tubes of ionically conductive glass electrolyte are positioned lengthwise along substantially parallel axes within the first portion of the housing. The tubes contain the positive electrode material. A plurality of elongated electrical conductors are axially disposed, one each in the glass electrolyte tubes. The conductors extend lengthwise beyond the glass electrolyte tubes into common electrical contact with the second portion of the housing. A plurality of curved protective shields are placed lengthwise in the first portion of the housing at least partially encompassing individual glass electrolyte tubes to form columnar housing portions containing the negative electrode material. The shields are placed sufficiently close to the outer circumferences of the glass electrolyte tubes to permit molten negative electrode material to wick between the shields and electrolyte tubes. Each of the shields contact adjacent shields at lengthwise surface portions to define columnar regions of negative electrode material. Electrical terminal means are coupled to the first and to the second housing portion for charging and withdrawing electrical energy from the cell.

In further aspects of the invention, the glass electrolyte tubes are sealed closed at their end portions and contain sulfur and graphite as the positive electrode material. The tubes are suspended in electrically insulated support into the first portion of the housing.

In other more specific aspects, the elongated electrical conductors pass through end seals in the glass electrolyte tubes in electrically insulated contact with the tubes and extend into common electrical contact with an electrically conductive bus bar member within the second housing portion.

In one other aspect of the invention, the curved protective shields comprised enlongated shield tubes encompassing individual glass electrolyte tubes to form annuli therebetween. The shield tubes have open ends immersed in molten negative electrode material with negative electrode material present within substantially the full length of the annuli.

In other aspects of the invention, the curved protective shields are serpentine sheets interposed between rows of glass electrolyte tubes. The sheets contact adjacent sheets between the tubes to define narrow annuli for molten negative electrolyte material at outside surfaces of the glass electrolyte tubes.

In other aspects, the elongated electrical conductors are received into a common electrically conductive bus member in electrical contact with the electrical terminal means at the second housing portion. The elongated conductor has a core of aluminum alloy of no more than 1 mm diameter capable of fusing on contact with negative electrode material.

In one other specific aspect, the elongated conductor includes an aluminum core with a molybdenium outer layer.

The present invention also contemplates a secondary electrochemical cell with chalogen-containing positive electrode material and alkali metal containing negative electrode material. An electrically conductive housing is divided into a first portion of negative electrode potential and a second portion of positive electrode potential with an electrically insulative seal therebetween. The first portion of the housing contains a plurality of tubular electrode components axially parallel lengthwise within the housing. The tubular components contact adjacent components to define curved triangular volumes for containing negative electrode material. The tubular electrode components include ionically conductive glass electrolyte tubes containing positive electrode material. An elongated electrical conductor within the glass electrolyte tube contacts the positive electrode material and extends axially beyond the glass electrolyte tube into common electrical contact with the second portion of the housing. An open-ended electrically conductive shield tube encompasses in space relation substantially the whole length of the glass electrolyte tube to define an annulus therebetween in which annulus, negative electrode material is wicked into contact with the glass electrolyte tube. The electrically conductive shield tubes are in common electrical contact with the first portion of the housing.

In other aspects of the invention, the positive electrode material includes sulfur, the negative electrode material includes sodium, and the glass electrolyte tube includes $Na_2O$, $Al_2O_3$, $ZrO_2$ and $SiO_2$ with a resistivity of less than 200 ohms-cm.

In other aspects of the invention, the glass electrolyte tubes are of about 1.5–6 mm in diameter with wall thicknesses of about 0.1 mm plus 5% of the electrolyte tube diameter. The shield tubes have inside diameters of about 1.03 to 1.1 of the outside diameters of the electrolyte tubes and form annular openings of no more than about one millimeter in width. This permits good wicking of negative electrode material in the annuli.

BRIEF DESCRIPTION OF THE DRAWINGS

The present invention is illustrated in the accompanying drawings wherein.

FIG. 1 is a prespective view of an electrochemical cell.

FIG. 2 is a fragmentary cross-sectional view of some of the electrode elements in the FIG. 1 electrochemical cell.

DETAILED DESCRIPTION OF THE INVENTION

Figure 3:
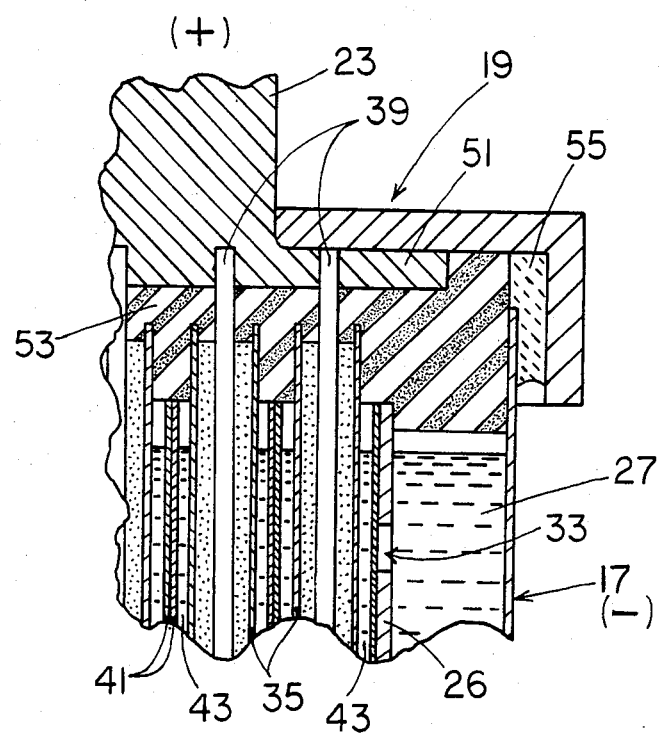
FIG. 3 is a fragmentary cross-sectional view at the transition of polarity in the electrochemical cell of FIG. 1.

In FIGS. 1 and 2, there is illustrated an electrochemical cell 11 including a housing 13 containing a plurality of electrode elements 15. Housing 13 is divided into a first portion 17 illustrated at negative polarity, electrically insulated from a second portion 19 illustrated at positive polarity. Electrical terminals 21 and 23 are illustrated in electrical contact with housing portions 17 and 19 respectively for withdrawing electrical energy from the electrochemical cell 11. Also shown is electrical insulator 25 separating negative electrical terminal 21 from positive housing portion 19.

A reservoir 27 for containing molten negative electrode material is illustrated as a vertical side section of housing 13. A partition 26 with openings 33 separates reservoir 27 from the electrode elements 15 but permits flow of negative electrode material to and from the electrode elements during electrochemical cycling. Alternatively, reservoir 27 can be at the center or some other selected section of housing 13. As will be discussed below, the combination of the additional negative electrode material in reservoir 27 and the wicking of negative electrode material in and among the electrode elements 15 assures that only minimal fluctuation in level will occur during cycling. Thus, electrochemical capacity and heat transfer capability are maintained during operation.

In the fragmentary cross-section of FIG. 2, the components of electrode elements 15 are illustrated with the corresponding reference numbers given in FIG. 1. Electrode elements 15 comprise an ionically conductive glass tube 35 containing positive electrode material 37 and an axial electrical conductor 39. Electrolyte tube 35 is closed at its distal end to prevent contact between the positive and negative electrode materials. An electrically conductive, protective shield tube 41 is shown encompassing the glass electrolyte tube 35. The outer surface diameter of tube 35 and inner surface of shield tube 41 define an annulus 43 for containing negative electrode material.

As illustrated in FIG. 1, shield tubes 41 extend to the distal end 31 of the first housing portion 17. Tubes 41 have open distal ends to admit negative electrode material from reservoir 27. Inasmuch as only a small flow of molten electrode material enters and leaves annuli 43 during electrochemical cycling, the naturally occurring, surface irregularities between the ends of tubes 41 and the surface of end 31 should provide sufficient openings. In cell configurations where larger flows are expected, slots, tabs, perforations, etc. (not shown) may be provided for openings into annuli 43.

Advantageously, the negative electrode material extends within substantially the full length of annuli 43 contacting substantially the complete outer surface of glass electrolyte tube 35. Wicking and hydrostatic forces will provide negative electrode material from reservoir 27 to thereby maintain the electrochemical capacity of the cell during cycling.

In FIG. 3 the transition of polarity between the first 17 and second 19 housing portions is illustrated. The first housing portion 17 containing the negative electrode material in reservoir 27 and in annuli 43 is at negative potential while the second housing portion 19 is at positive potential. Positive electrode potential is conducted to terminal 23 through bus-plate 51 which receives the ends of axial conductors 39 in electrical contact. Conductors 39 sealingly extend beyond the ends of electrolyte tubes 35 through high temperature, electrical insulation 53 separating the negative electrode material from bus plate 51. Further electrical insulation is provided by a seal 55 of glass or other suitable material extending arround the perimeter of the interface between housing portions 17 and 19.

In the operation of the electrochemical cell of this invention, negative electrode material reacts at the outer surface while positive electrode material 37 reacts at the inner surface of the glass electrolyte tube 35 to generate an electric current on completion of the circuit through a load between electrical terminals 21 and 23 of the cell.

Although various electrode materials can be used, the electrochemical cell of this invention is well adapted for the alkali metal-chalcogen system. In particular, molten sodium metal is contemplated as the negative electrode material and molten sulfur with particulate graphite current collector is contemplated as the positive electrode material. Glass electrolyte tubes that will conduct sodium or other alkali metal ions are selected for conduction between the positive and negative electrode materials. One particular, well-suited glass electrolyte of high ionic conductivity is that of the soda-alumina-zirconia-silica glass system. Table I below shows the characteristics of representative soda-alumina-zirconia-silica glasses with sufficiently low resistivity for use in an electrochemical cell of the present design.

TABLE I

Characteristics of Representative Soda-Alumina-Zirconia-Silica Glasses

| Constituents | | | | Resistivity, |
|---|---|---|---|---|
| $Na_2O$ | $Al_2O_3$ | $ZrO_2$ | $SiO_2$ | ohm-cm 300° C. |
| 46.6 | — | — | 53.4 | 192 |
| 37.2 | 11.4 | — | 51.4 | 484 |
| 41.0 | — | 7.9 | 51.1 | 195 |
| 41.4 | 8.2 | 5.8 | 44.6 | 162 |
| 41.1 | 6.4 | 4.0 | 48.5 | 130 |
| 41.9 | 16.0 | 10.0 | 32.1 | 247 |
| 40.7 | 10.8 | 8.3 | 40.2 | 215 |

These ionically conductive glasses in the soda-alumina-zirconia-silica system are more fully described along with their method of preparation in U.S. Pat. No. 4,544,614 to Kucera et al. This patent is specifically incorporated by reference for this purpose.

By using these ionically conductive glasses of low resistivity and high conductivity, glass electrolyte tubes of 1.5 to 6 mm diameter can be employed in the electrochemical cell of this invention. Such tubes with wall thicknesses of about 0.1 mm plus 5% of the diameter can be formed by known glass forming techniques with the tube ends sealed off to permit their use in the electrochemical cell.

In the sodium sulfur cell, the positive electrode can include molten sulfur and graphite extruded over an electrically conductive axial wire 39. This positive electrode is inserted into a closed end glass electrolyte tube. The glass electrolyte tubes are aligned into rows and sealed together into the electrically insulative header 53, illustrated in FIG. 3.

The protective shield tubes 41 can be of steel or aluminum and inserted over the glass electrolyte tube to provide annuli 43, that are sufficiently narrow for good sodium wicking. Although the protective shield tubes must have a sufficiently large inside diameter to permit assembly, the resulting annular openings should be no more than about 1 mm in width to enhance wicking of the molten sodium electrode material. Preferably, the protective tubes have inside diameter of about 1.03 to 1.1, e.g. about 1.05 of the outside diameter of the glass electrolyte tubes. It will be clear, that without spacers or other lateral support in the annuli, the glass tubes are likely to contact the inside diameters of the protective shields at various locations along the length leaving an increased annuli width at opposing diametric locations. Such potential for increased annuli width is taken into account in selecting tube sizes to ensure good wicking of the negative electrode material.

It is preferred that the protective tubes with contained glass electrolyte be arranged in a close packed hexagonal array. This defines curved triangular regions 42, illustrated in FIG. 2. The columnar triangular regions 42 are filled with sodium metal to provide enhanced heat transfer laterally through the bundle of electrode elements. The triangular regions 42 offer close dimensions between the adjacent shield tubes in the array. Consequently, wicking or capillary forces tend to keep the triangular regions filled during electrochemical cycling. The sodium for electrochemical reaction is contained in reservoir 27 and wicked into annuli 43 as needed.

Figure 4:
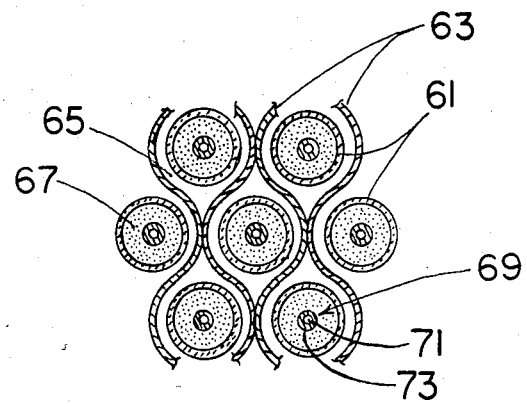
FIG. 4 is a fragmentary cross-sectional view of an alternative configuration of electrode elements.

In FIG. 4, an alternative curved shielding arrangement for the electrolyte tubes is illustrated. Glass electrolyte tubes 61 containing positive electrode material 67 are protected and separated from each other by curved shields 63. The shields 63 are arranged as serpentine walls within the bundle of electrode elements. The shields 63 and glass electrolyte tubes 61 define annuli or annular volumes 65 therebetween of sufficiently small width to permit wicking of the negative electrode material e.g., liquid sodium metal into contact with the electrolyte.

To protect against corrosion, the axial conductor 69 can include a core 71 of good electrically conductive material and a coating 73 of corrosion resistant material. For instance, in a sodium-sulfur cell an aluminum core with molybdenum coating can be used advantageously. In addition, the aluminum core can be of small diameter to fuse on contact with negative electrode material and thereby remove damaged subcomponents from cell operation. An aluminum core of no more than about 1 mm diameter is preferred for this purpose.

Figure 6:
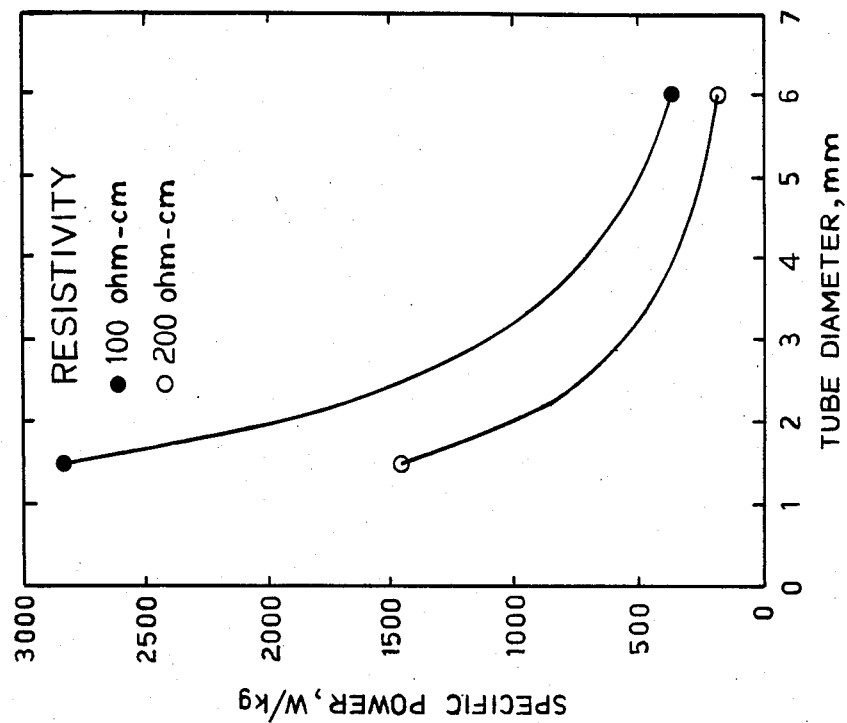
FIG. 6 is a graph of specific power vs tube diameter for the cell of FIG. 5.
Figure 5:
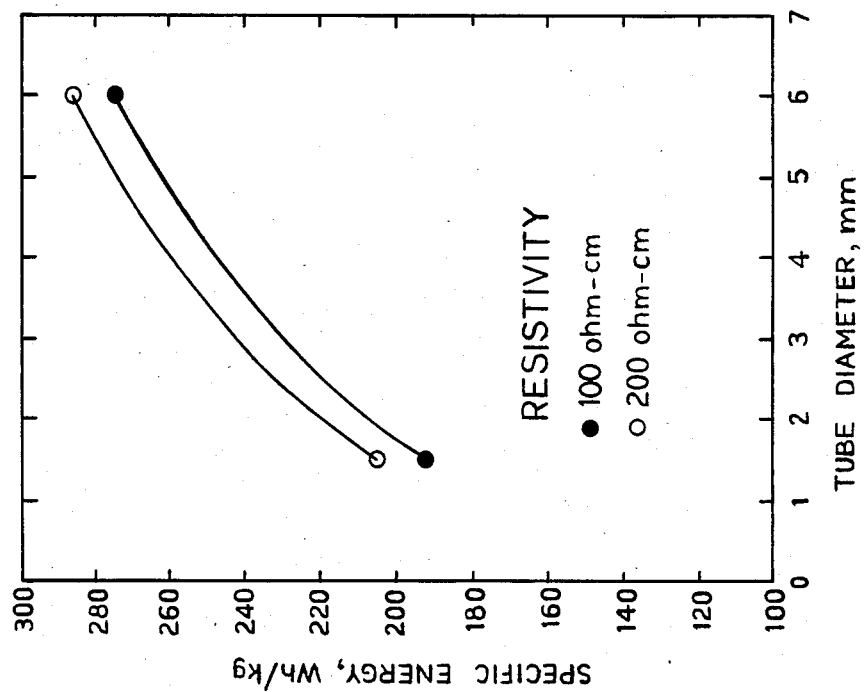
FIG. 5 is a graph of specific energy vs electrolyte tube diameter at expected resistivities for a 150 amperhour electrochemical cell.

FIGS. 5 and 6 are presented to show specific energy and specific power as a function of tube diameter determined for a 150 amp hour sodium-sulfur cell. Glass electrolytes of 100 ohm-cm and 200 ohm-cm resistivity are modelled for these electrochemical cells. Additional data characterizing the cell with 100 ohm-cm electrolyte are given in Table II below.

TABLE II

| Capacity: 150 A hr Electrolyte Resistivity: 100 ohm-cm | | |
|---|---|---|
| | High Energy Cell | High Power Cell |
| Specific Energy, W hr/kg | 270 | 184 |
| Specific Power (30 sec), W/kg | 370 | 2800 |
| Average Voltage, 3 hr Discharge, V | 1.8 | 1.8 |
| Voltage at Full Power, V | 1.4 | 1.4 |
| Electrolyte Tube Dia, mm | 6.0 | 1.5 |
| Elements per Cell | 81 | 3721 |
| Cell Weight, g | 1000 | 1470 |
| Cell Volume, cc | 770 | 1000 |

It can be seen from the above that high specific power and high specific energy electrolytic cells can be achieved with the design of the present invention. The high energy cell defined in Table II would be ideal for use in an electric car. It is expected that a battery of about 100 kilograms would be appropriate for a 1000 kilogram electric car and could provide 27 kilowatts/hour of energy sufficient for a range of about 80 to 100 miles.

In other applications requiring a rechargeable battery with high power and moderately high specific energy, the high power cell of Table II can be chosen. The large electrolyte surface area and good electrical conductivity of the electrode current collectors would permit high power operation. In addition, the cell configuration has a short continuous metallic sodium path for transfer of heat from the interior of the cell to cooled outer surfaces. For applications of extremely high power, the thickness of the cell could be reduced to 2 or 3 cm and the width increased accordingly to provide a very short heat transfer path to broad outer surfaces provided with coolant contact.

Although the present invention is described in terms of specific materials and structure, it will be clear to those skilled in the art that various modifications may be made within the scope of the following claims.

The embodiments of this invention in which an exclusive property or privilege is claimed are defined as follows:

1. A secondary electrochemical cell with chalcogen containing positive electrode material and alkali metal containing negative electrode material comprising
   an electrically conductive housing having a first portion thereof at negative electrode polarity, a second portion thereof at positive electrode polarity and an electrically insulative seal between the first and second portions;
   a plurality of elongated tubes of ionically conductive glass electrolyte affixed lengthwise along substantially parallel axes within the first portion of said housing, the tubes containing the positive electrode material;
   a pluality of elongated electrical conductors, each axially disposed in one of the plurality of glass electrolyte tubes, said conductors extending lengthwise beyond the glass electrolyte tubes into common electrical contact with the second portion of said housing;
   a plurality of curved protective shields placed lengthwise in the first portion of said housing at least partially encompassing individual glass electrolyte tubes to form columnar annuli for containing the negative electrode material, said shields placed sufficiently close to the outer surfaces of the glass electrolyte tubes to permit molten negative electrode material to wick therebetween, and each of said shields contacting adjacent shields at lengthwise surface portions to define columnar regions of molten negative electrode material,
   electrical terminal means coupled to said first and second housing portions for charging and withdrawing the electrical energy of said cell.

2. The electrochemical cell of claim 1 wherein the glass electrolyte tubes are sealed closed and contain sulfur and graphite as positive electrode material, said tubes are suspended in electrically insulative support into the first portion of said housing.

3. The electrochemical cell of claim 1 wherein said elongated electrical conductors pass through end seals in said glass electrolyte tubes in electrically insulative contact therewith and extend into electrical contact with a common bus member within the second housing portion.

4. The electrochemical cell of claim 1 wherein said curved protective shields comprise elongated shield tubes encompassing individual glass electrolyte tubes to form annuli therebetween, said shield tubes having open ends immersed in molten negative electrode material and said molten material is present within substantially the full length said annuli.

5. The electrochemical cell of claim 1 wherein said curved protective shields comprise serpentine sheets interposed between rows of glass electrolyte tubes, said sheets contacting adjacent sheets between said tubes to define narrow annular volumes for molten negative electrode material at outside surfaces of the glass electrolyte tubes.

6. The electrochemical cell of claim 1 wherein said elongated electrical conductors are received into a common electrical bus member in electrical contact with the electrical terminal means at the second housing portion, and wherein said conductor has a core of aluminum alloy of no more than 1 mm diameter, capable of fusing on contact with negative electrode material.

7. The electrochemical cell of claim 6 wherein said elongated electrical conductors include an aluminum core with a molybdenum outer layer.

8. A secondary electrochemical cell with chalcogen containing positive electrode material and alkali metal containing negative electrode material comprising
   an electrically conductive housing having a first portion at negative electrode polarity, a second portion at positive electrode polarity, an electrically insulative seal between the first and second portions and electrical terminal means connected to the first and second portions for withdrawing and recharging the electrical energy of the cell;
   a plurality of tubular electrode elements axially parallel lengthwise within the first portion of said housing, said tubular elements contacting adjacent tubular elements to define curved triangular, columnar volumes for containing negative electrode material;
   said tubular electrode elements comprise an ionically conductive, glass electrolyte tube containing positive electrode material, an elongated electrical conductor contacting the positive electrode material axially within and extending lengthwise beyond the glass electrolyte tube into common electrical contact with the second portion of the housing, and an open-ended electrically conductive shield tube encompassing in spaced relation substantially the full length of the glass electrolyte tube to define an annular volume of sufficiently narrow opening width to wick negative electrode material between the glass electrolyte and shield tubes, said electrically conductive shield tube being in common electrical contact with adjacent shield tubes and with the first portion of the housing.

9. The electrochemical cell of claim 8 wherein the positive electrode material includes sulfur, the negative electrode material includes sodium, the shield tube is an electrically conductive aluminum or steel alloy and the glass electrolyte tube includes $Na_2O$, $Al_2O_3$, $ZrO_2$ and $SiO_2$ with a resistivity of less than 200 ohm-cm.

10. The secondary electrochemical cell of claim 8 wherein the electrically insulative seal comprises an electrically insulative glass seal extending around the perimeter of the interface between the first and the second housing portions.

11. The secondary electrochemical cell of claim 10 wherein said glass electrolyte tube is sealed closed with contained positive electrode material.

12. The secondary electrochemical cell of claim 10 wherein the first portion of said housing is substantially filled with molten negative electrode material around said tubular electrode components and wherein at least one section of the first housing portion being free of electrode components and substantially filled as a reservoir of molten negative electrode material.

13. The secondary electrochemical cell of claim 8 wherein said curved triangular volumes are substantially filled with molten negative electrode material to enhance heat transfer between the tubular electrode components.

14. The secondary electrochemical cell of claim 8 wherein the glass electrolyte tubes are about 1.5–6 mm in diameter with wall thickness of about 0.1 mm plus 5% of the tube diameter.

15. The secondary electrochemical cell of claim 8 wherein said elongated electrical conductor comprises an aluminum core and a molybdenium outer layer.

16. The secondary electrochemical cell of claim 8 wherein a plurality of elongated electrical conductors extend into electrical contact with a common electrical bus in electrical contact with the second housing portion.

17. The secondary electrochemical cell of claim 8 wherein said shield tube has an inside diameter of about 1.03 to 1.1 of the glass electrolyte tube outside diameter to form an annular opening of no more than about one millimeter width.

* * * * *